United States Patent
Wu

Patent Number: 5,291,386
Date of Patent: Mar. 1, 1994

[54] SWITCHED MODE POWER SUPPLY WITH PRECHARGE OF BASE-EMITTER SWEEP-OUT CAPACITOR

[75] Inventor: Chun H. Wu, Singapore, Singapore

[73] Assignee: Thomson Consumer Electronics, S.A., France

[21] Appl. No.: 918,533

[22] Filed: Jul. 22, 1992

[30] Foreign Application Priority Data

Aug. 1, 1991 [GB] United Kingdom ............... 9116616

[51] Int. Cl.$^5$ .................................... H02M 7/5375
[52] U.S. Cl. .................................... 363/21; 323/289; 363/49
[58] Field of Search ............... 315/411; 363/20, 21, 363/49, 131; 323/289; H02M 7/5375

[56] References Cited

U.S. PATENT DOCUMENTS

| | | | |
|---|---|---|---|
| 4,312,029 | 1/1982 | Zellmer | 363/21 |
| 4,609,980 | 9/1986 | Hoffman | 363/20 |
| 4,975,823 | 12/1990 | Rilly et al. | 363/56 |

FOREIGN PATENT DOCUMENTS

| | | | |
|---|---|---|---|
| 60-13473 | 1/1985 | Japan | 363/49 |
| 60-194757 | 10/1985 | Japan | 363/49 |

OTHER PUBLICATIONS

Blaesner, "Erhöhte Betriebssicherheit und Niedrigere Kosten" Elektronik (Germany), vol. 9, No. 39, pp. 134–140, Apr. 27, 1990.

Primary Examiner—William H. Beha, Jr.
Attorney, Agent, or Firm—J. S. Tripoli; J. J. Laks; D. E. Sragow

[57] ABSTRACT

A television receiver has a switched mode power supply for regulating an output voltage, including a power transformer having a primary winding coupled to an unregulated voltage via a power transistor. The power transistor is controlled by pulses from the output of a controller. In order to sweep the base-emitter charge from the power transistor in order to end collector-emitter conduction, the base of the power transistor is coupled to the output of the pulse generating controller via a capacitor in parallel with at least one diode. During a pulse from the controller, the capacitor is charged to a voltage equal to the forward biased drop across the diode(s). At the end of a pulse at the output of the controller, the voltage across the capacitor provides a negative voltage at the base of the transistor, thus sweeping out the base-emitter charge and sharply turning the transistor off. In order to assure this function of the capacitor even upon plug-in startup, the capacitor is precharged via a resistor coupled between the output of the controller and the unregulated voltage input.

11 Claims, 6 Drawing Sheets

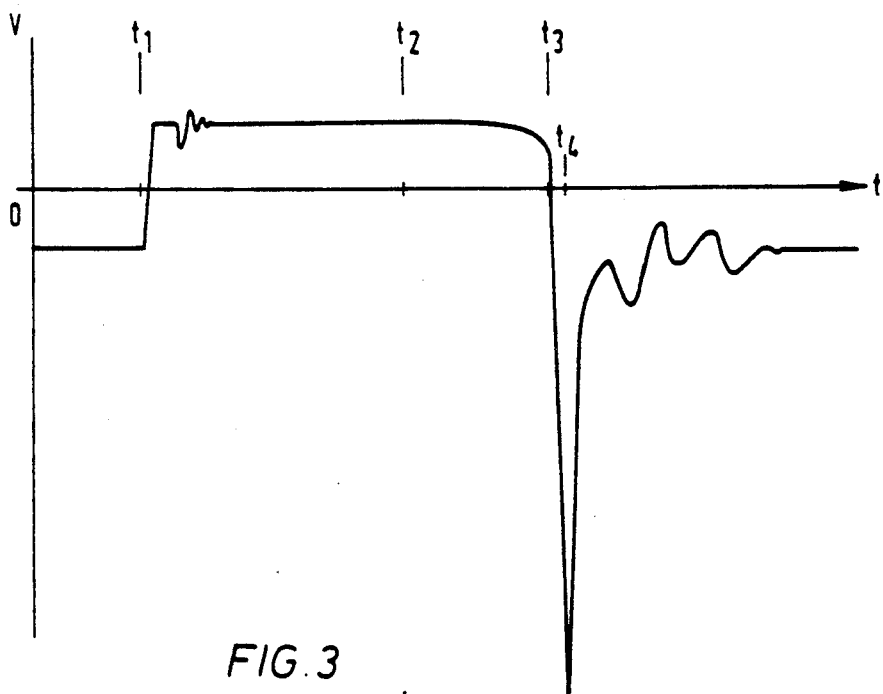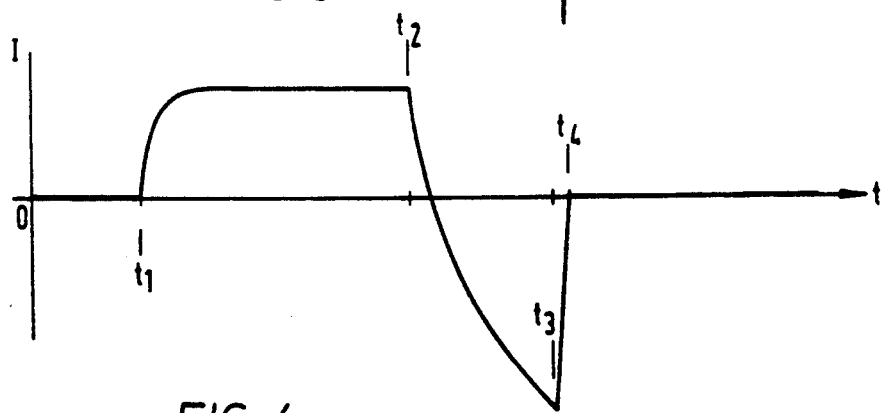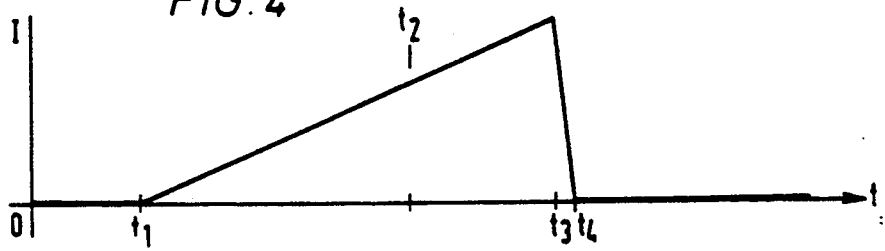

SWITCHED MODE POWER SUPPLY WITH PRECHARGE OF BASE-EMITTER SWEEP-OUT CAPACITOR

The invention relates to a television receiver with a switched mode power supply having a power transistor coupled to a controller via a pull down capacitor, and wherein the pull down capacitor is precharged for achieving stable operation promptly after plug-in startup.

A switched mode power supply transfers a variable amount of power from an unregulated DC supply voltage to load circuits coupled to secondary windings of a power transformer. In conjunction with a pulse width modulator, a power supply controller applies pulses to the primary winding of the transformer via a power transistor. By feeding back the voltage level at a given secondary winding and varying the pulse width to maintain the voltage at the secondary winding equal to a reference level, the power supply regulates the voltage in all of the secondary windings.

An example of a switched mode power supply controller is SGS-Thomson Microelectronics type TEA2260. The pulses applied to the primary winding of the power supply transformer by the TEA2260 controller are synchronized to the horizontal retrace pulses in an operational mode or run mode, and are internally generated by the controller in the standby mode, when retrace pulses are not produced. The current pulses in the power transformer are varied in pulse width for regulating the output voltage at the secondary windings, including the B+ scan supply voltage which is applied to the flyback transformer, but loaded only in the operational mode.

In the operational mode, the B+ voltage is fed back to the controller in the form of a pulse width modulated signal obtained from a pulse width modulator located on the secondary side of the power transformer, the feedback being sent to the controller located on the primary side via a signal transformer. The switched mode power supply remains active in both the run mode and the standby mode, providing power in the standby mode to those circuits which control switching between the run mode and the standby mode, such as the infrared receiver and the system microprocessor which monitors the infrared receiver. In the run mode the switched mode power supply not only powers the active switching circuits, but also powers the flyback transformer to drive the horizontal deflection circuit and the flyback-derived high voltage power supply. The B+ supply voltage for the flyback transformer is generated whenever pulses are output from the switched mode power supply controller, i.e., in both the run mode and the standby mode.

To enter the standby mode, the horizontal oscillator is disabled by a signal generated by the system microprocessor. When no horizontal signal is available, in the absence of horizontal scanning, the TEA2260 controller free runs at a pulse frequency defined by the time constant of a capacitor and resistor coupled thereto, and regulates its output by feedback from a secondary winding of the power transformer which generates the VCC supply voltage to the TEA2260 controller, instead of feedback from the pulse width modulator as a function of the B+ level.

Whereas the controller VCC supply voltage is generated as a result of controller output pulses, it is necessary to start up the controller into operation from an independent voltage supply when the receiver is first coupled or plugged in to the AC mains. A supplemental startup supply circuit including a storage capacitor is coupled to the VCC input to the TEA2260 and charged via the AC mains at plug-in startup. Once the controller is powered by the voltage ramping up in the storage capacitor to adequate operational levels, the controller begins to generate pulses and can regulate its own VCC level via the feedback from the power supply transformer secondary winding. The VCC level is brought up to a nominal level while being subject to current limiting slow or soft start controls and maximum output limitations which are internal to the TEA2260 controller, and are intended, among other things, to avoid an initial current surge upon plug-in startup.

There is a substantial difference in current loading of the switched mode power supply between the run mode and the standby mode. It is difficult to provide a power transistor capable of driving the primary winding of the power supply transformer at the relatively high power levels needed for operation in the run mode, and also at the very short pulse widths needed in the standby mode. The TEA2260 has a burst mode to accommodate low power requirements during standby. In that mode, the controller alternately ceases generation of pulses, whereupon storage capacitors coupled to the standby loads discharge within a specific range, and then resumes generation of a burst of pulses. The burst mode is thus characterized by periodic occurrences of pulse trains from the switched mode supply controller of sufficient duration to drive VCC to an upper limit, followed by a lapse of pulses during which VCC decays to a lower limit.

In the run mode of the television receiver, the TEA2260 controller operates in a slave mode responsive to a master pulse width modulator coupled to an operational supply on the secondary side of the power transformer. In the standby mode, however, the secondary side input from the pulse width modulator is missing, and accordingly the controller assumes a primary regulation mode wherein its error input, derived from VCC, is the basis of control. This latter situation characterizes the standby burst mode. In the run mode, when the pulse width modulator is driving the controller, the primary side error input is ignored.

The output stage of the TEA2260 controller has a push-pull output stage including two Darlington NPN transistors operated alternately, for producing substantially square pulses. The power transistor coupled to the output of the controller for driving the primary winding of the transformer should be shut off sharply at the end of a pulse, such that conduction in the power transistor, and therefore conduction in the primary winding of the power transformer, correspond closely to the controller output pulse width. However, power transistors are constructed for accommodating substantial current capacity rather than for quick turn off. In saturation of the power transistor during a pulse, a relatively large base region charge is accumulated. As a result the power transistor continues to conduct after the trailing edge of a control pulse, so long as base charge remains. It is known to shut the transistor off more quickly by draining the base charge at the end of a pulse. The time during which the power transistor continues to conduct after the pulse input at the transistor base goes low is known as the turn off delay time and includes the storage time.

In a known base pull down circuit for draining base charge in a power transistor, a capacitor is coupled in parallel with a zener diode, and in series between the output of the controller and the base of the power transistor. When the controller output is high, the capacitor provides current to the transistor base until the zener breaks down, and thereafter the zener conducts base current. The capacitor charges to a voltage defined by the breakdown voltage of the zener diode. When the output of the controller goes low, the capacitor applies a negative voltage to the base of the transistor, and sweeps out the base charge to turn off the transistor more quickly than it would turn off if the pulse were coupled directly to the base of the transistor. Sweeping out the base charge also takes time, but this provision at least shortens the pulse width of the current in the transistor collector to a width more nearly equal to the width of the controller output pulse.

It is also known to provide means for impressing a negative voltage on the output of the controller by developing a negative voltage from one of the secondary windings of the power transformer, and then coupling the negative voltage to the emitter of the output transistor which pulls down the output voltage of the controller between pulses. Such a procedure is not available where the controller is an integrated circuit such as the TEA2260. The emitter of the output transistor in the integrated circuit is internally coupled to ground, and is thus inaccessible for coupling to a negative bias. Furthermore, undesirably, an additional negative voltage supply must be included in the power supply.

When plugged into the AC mains, the television receiver starts up in the standby mode and the controller operates in the burst mode, providing bursts of short pulses for driving VCC at the controller upwardly within its limits. The controller comprises a number of internal protective circuits which limit the current output of the switched mode power supply such that an initial surge of current is not provided when the receiver is first coupled to the AC mains. A problem is encountered during plug-in startup of the switched mode power supply circuit. The pulldown capacitor in series between the output of the controller and the base of the transistor (which capacitor is to be charged by output pulses from the controller) has not yet been charged. The power transistor cannot be shut off quickly or dependably during the period immediately after plug-in startup. Of course this is the critical period wherein the protective circuits of the controller are expected to prevent a current surge. The storage time during which the power transistor conducts after the falling edge of a controller pulse is long, leading to undependable operation of the switched mode power supply during startup. More particularly, the ineffectiveness of the uncharged pull-down capacitor is such as to defeat initial operation of the protective circuits.

It is a feature of the invention to provide a television receiver comprising a switched mode power supply for regulating at least one output voltage by generation of output pulses coupled to a power transistor. The power transistor is coupled to an inductance which is coupled to the input voltage. The switched mode power supply has a sense input operable to regulate the output voltage by modulating conduction of the power transistor so as to maintain the output voltage at a predetermined level. A circuit couples the output pulses to the base of the power transistor, the circuit comprising a pull down capacitor in series with the base, and an impedance in parallel with the pull down capacitor, whereby during an output pulse the pull down capacitor is charged according to a first polarity causing the power transistor to conduct. Following an output pulse, the capacitor applies an opposite polarity to the base of the power transistor for sharply ceasing conduction of current through the power transistor. Means precharges the capacitor prior to the appearance of the first one of said output pulses.

In accordance with another feature of the invention, a switched mode power supply comprises a source of unregulated voltage, a load, and a switching transistor coupling said source to said load. A capacitor is coupled to a control terminal of said transistor. A source of control pulses is coupled to the control terminal of said transistor through said capacitor. Means charges said capacitor from said source of unregulated voltage.

FIGS. 2–4 are corresponding timing diagrams illustrating the normal operation of the switched mode power supply, FIG. 2 showing the voltage signal at the base of the power transistor, FIG. 3 showing the current signal, and FIG. 4 showing the collector current.

FIGS. 10–13 are corresponding timing diagrams showing plug-in start-up operation of the circuit according to the invention, in particular during the first pulse from the power supply controller, respectively showing the voltage at the base of the power transistor, the current in the base of the power transistor, the voltage at the output of the controller, and the current in the power transistor collector.

Figure 1:
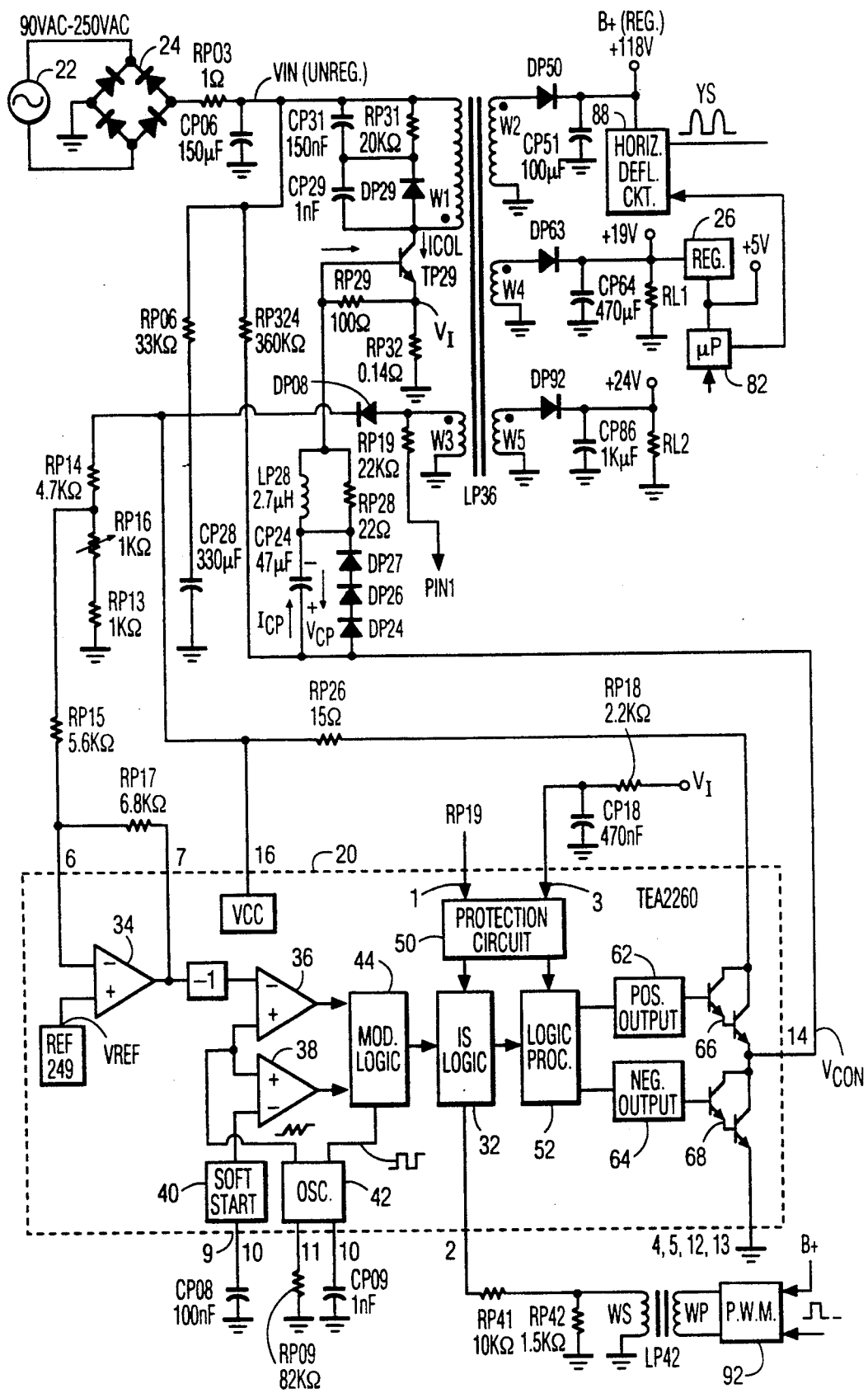
FIG. 1 is a detailed schematic diagram showing the circuit of the invention.

FIGS. 14–17 are corresponding timing diagrams showing plug-in start-up operation of a circuit as in FIG. 1, but where the pull down capacitor is not precharged. FIGS. 14–17 correspond to FIGS. 10–13 for such a circuit.

Figure 18:
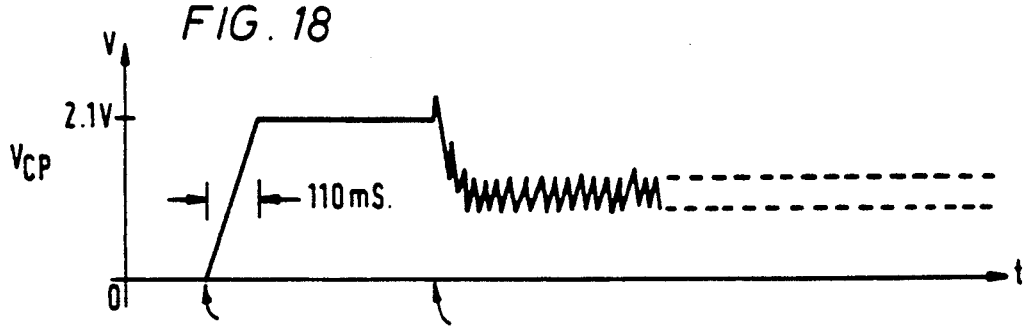

FIG. 18 is a timing diagram showing the voltage across the pull-down capacitor following coupling of the receiver to the AC mains, illustrating precharging of the pull-down capacitor.

Figure 19:
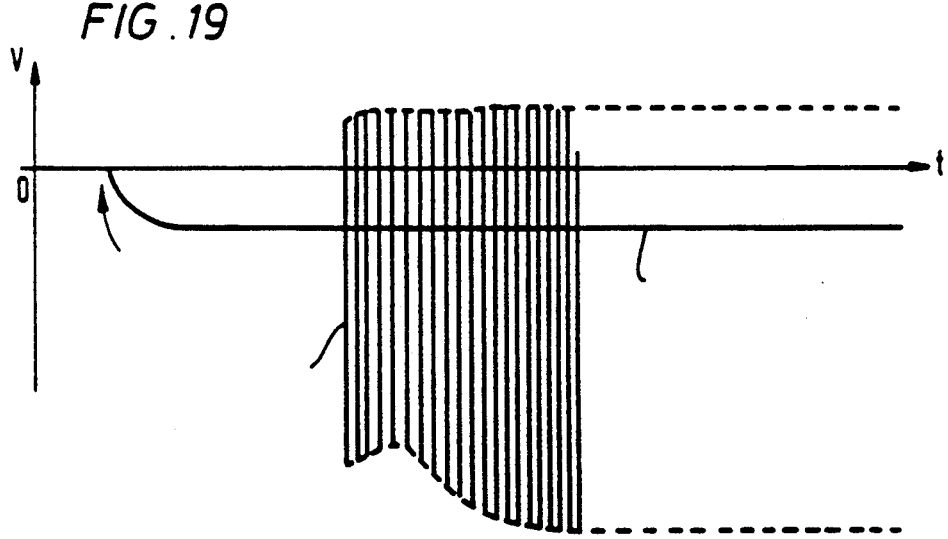

FIG. 19 is a timing diagram according to the invention, showing the voltage at the base of the power transistor over an extended time following start-up, with precharging of the pull-down capacitor.

Figure 20:
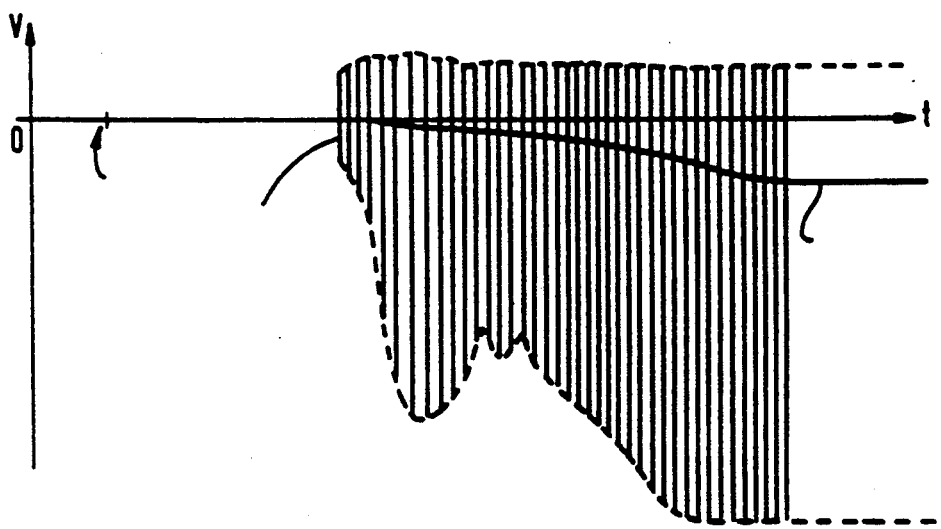

FIG. 20 is a timing diagram comparable to FIG. 19, showing the voltage at the base of the power transistor over an extended time following start-up, but without precharging of the pull-down capacitor.

In FIG. 1, power to the television receiver from AC mains 22, which can be between 90 and 250 VAC for operation worldwide, is full wave rectified by bridge 24 and filtered by capacitor CP06 and resistor RP03, to provide the unregulated input voltage VIN, coupled to an inductance such as primary winding W1 of power transformer LP36. The other terminal of winding W1 is coupled to the collector of power transistor TP29, which is driven by the output of switched mode power supply controller 20, such as SGS-Thomson Microelectronics type TEA2260, the respective pin numbers of connections to the controller being shown in the figure.

Controller 20 has two operational modes. In the slave mode, controller 20 is responsive to width modulated pulses fed back from a pulse width modulator 92. The width of the pulses controls the energy transferred from unregulated input voltage VIN to the B+ regulated output and other secondary supplies of transformer LP36. The B+ output is coupled to a horizontal deflection circuit 88, for driving horizontal scanning via a flyback transformer (not shown) and thereby coupling power to various loads which are energized only in the run mode of operation of the television receiver. The pulse width modulator is coupled to the B+ supply and to synchronizing pulses VS from the horizontal deflection circuit 88.

In a second mode of operation of controller 20, i.e., when no width modulated pulses are applied for regulation from the secondary side of the power supply due to lack of horizontal scanning, controller 20 reverts to a primary regulation mode based upon an error input derived from secondary winding W3 of power transformer LP36. Regulation via the error input is active only in the absence of pulses from the secondary side feedback from pulse width modulator 92. When such pulses are present, the error input is ignored.

The television receiver powers up operation in the standby mode when coupled to AC mains 22, and can be switched into the run mode under control of microprocessor 82. Microprocessor 82 as well as the power supply controller 20 are powered during the standby mode as well as the run mode. Microprocessor 82 has an input ON/OFF coupled to a switching means, such as an infrared receiver, and an output coupled to horizontal deflection circuit 88 for disabling the horizontal deflection circuit and switching into the standby mode.

When first coupled to AC mains 22, power to the VCC pin of controller 20 is provided by a startup current supply coupled to the unregulated VIN voltage from bridge rectifier 24. Capacitor CP28, which is coupled to VCC pin 16 of controller 20, is charged through a relatively high value current limiting resistor RP06. As the VCC voltage across capacitor CP28 ramps up, controller 20 becomes operational and begins to output pulses. The output pulses from controller 20 are coupled to power transistor TP29 which couples the unregulated VIN to primary winding W1 of power transformer LP36. The resulting pulses on secondary winding W3 are rectified by diode DP08, filtered by capacitor CP28, and coupled to the VCC input of controller 20. The controller thus powers itself starting initially from the charge applied to capacitor CP28 through start-up resistor RP06.

Controller 20 has a number of internal limiting and shutdown circuits 50 to prevent overvoltage or overcurrent conditions from occurring or persisting, and can limit its output as the power supply powers up, for avoiding a potentially damaging surge of current into uncharged storage capacitors, and the like, upon start-up. To this end, a soft start circuit 40 is coupled to a capacitor CP08 to define the rate at which the amplitude of successive output pulses can increase. According to the TEA2260, minimum and maximum VCC voltage limits are established by a VCC monitoring circuit and overvoltage comparator in a protection circuit 50. Repeated overload is sensed by a comparator coupled to internal voltage and current references. Maximum output current in power transformer LP36 is limited by current limiting comparators coupled to a current sensing resistor RP32 in series with the emitter of power transistor TP29. Demagnetization is sensed by winding W3 being coupled to protection circuit 50 at pin 1.

In the standby mode, when no pulses are provided from pulse width modulator 92, controller 20 regulates the voltage from secondary winding W3 as sensed at the error input, pin 6, of an error amplifier 34. The sensed level is provided via a voltage divider comprising resistor RP14, variable resistor PP16 and resistor RP13, coupled between VCC and ground. The sensed voltage level is thus a proportion of VCC, and is compared with an internal reference, VREF, of 2.49 volts coupled to the noninverting input of error amplifier 34. Resistor RP17 is coupled between the output of the error amplifier 34 and the inverting input, to set the gain of the error amplifier.

When operation of controller 20 has driven VCC to a high enough level that the error amplifier output indicates that a high VCC threshold level has been reached, controller 20 enters the burst mode and internally revises its operation to track on 90% of the reference level of voltage VREF rather than 100%. Generation of pulses ceases, and the VCC voltage accumulated in storage capacitor CP28 decreases over time until the voltage meets the 90% threshold. At that point, controller 20 resumes the original 100% threshold level and outputs a train of pulses to recharge the VCC output to produce a 100% reference level at the inverting input of comparator 34, and so forth. The regulated output voltage at VCC defines a series of rising and falling ramp voltages with a hysteresis between the two thresholds.

The output of error amplifier 34 is coupled to modulators 36, 38 which are also coupled to the soft start rising reference voltage level obtained from soft start circuit 40, and to the ramp output of an oscillator 42. The modulator outputs are coupled to modulation logic and automatic burst generator 44, the latter being coupled to a pulse output of oscillator 42. The oscillator ramp slope, the pulse width, and the oscillator frequency are set via external resistor RP09 and capacitor CP09.

An IS logic stage 32 preferentially couples the input from the secondary winding WS of pulse width modulator transformer LP42 through to the output of controller 20, via a resistor RP41. However when no pulses are received through resistor RP41, the output of modulator logic element 44 is coupled through to the output of the controller. Regulation pulses from IS logic block 32 are coupled to logic processor 52, and through positive and negative output drivers 62, 64 to Darlington pair output transistors 66, 68. Output transistors 66, 68 are operated alternately in a push-pull arrangement wherein only one is conductive at any one time. Output transistor 66 supplies current to the controller output pin via VCC and a resistor RP26, which sets the positive output current level. Output transistor 68 sinks current from output pin 14, effectively grounding the output pin of controller 20.

The output of controller 20 is coupled to the base of power transistor TP29 through a base network, including a pull-down capacitor CP24 in parallel with an impedance, such as at least one diode, and preferably a plurality of diodes DP24, DP26 and DP27. At the leading edge of a pulse at the output of controller 20, diodes DP24, DP26 and DP27 are forward biased and thus define a 3-diode drop, capacitor clamping voltage of about 2.1 volts. The diodes determine the maximum charge for capacitor CP24. At the trailing edge of a pulse at the output of controller 20, output transistor 68 grounds the more positive terminal of pull-down capacitor CP24, thus placing a negative voltage of 2.1 volts on the base of transistor TP29. The negative voltage from the accumulated charge in capacitor CP24 generates a negative base current which sweeps out the base charge in power transistor TP29. This quickly stops conduction of TP29. Inductor LP28, paralleled by a damping resistor RP28, provides current pulse shaping to the base of transistor TP29. A resistor RP29 provides base-emitter biasing. The LC network, including inductor LP28 and the transistor base capacitance, establishes the slope of the reverse base current in power transistor TP29 when the base current is to be reversed by the application of a negative voltage from capacitor CP24. Inductance in the base circuit is also responsible for certain spikes which appear in the controller output voltage (see, e.g., FIG. 5) and in the collector current (e.g., FIG. 13).

At the collector of transistor TP29, a damping arrangement is defined by diode DP29 and resistor RP31, with capacitors CP29 and CP31 being coupled in parallel with diode DP29 and resistor RP31, respectively.

In addition to the secondary winding W3, which provides power for VCC of the controller 20, other secondary windings W2, W4 and W5 provide other output voltages which are regulated by the controller, together with regulation via the B+ supply during scanning or the VCC supply in the absence of scanning. The signal on secondary winding W2 is rectified by a diode DP50 and filtered by a capacitor CP51, providing the regulated B+ output at +118 V for powering horizontal deflection circuit 88. A +19 V supply is provided by winding W4, as rectified by diode DP63 and filtered by capacitor CP64, for energizing a load, shown as resistor RL1. Winding W5 provides +24 V via a diode DP92 and a capacitor CP86 for energizing a load, shown as resistor RL2.

The output voltages at all the secondary windings of power transformer LP36 are regulated together with regulation of VCC by controller 20. Since controller 20 operates in both the run mode and the standby mode, the secondary supplies including the B+ voltage are always generated. The +19 V supply is further regulated to +5 V by a regulator 26, for providing a stable supply voltage to microprocessor 82, notwithstanding the rise and fall of VCC during standby in the burst mode of controller 20.

According to an inventive feature, the positive terminal of the pull-down capacitor CP24 is coupled to the unregulated input voltage VIN. The unregulated voltage VIN appears as soon as the circuit is coupled to the AC mains, i.e., before controller 20 begins to output pulses. The timing diagrams of FIGS. 2–9 illustrate steady state circuit conditions in the standby mode of the television receiver, when the controller 20 operates in its burst mode. FIGS. 10–20 illustrate circuit conditions following plug-in startup, i.e., initial connection of power to AC mains 22. All the figures represent idealized traces of the respective signals, with certain noise and coupling effects omitted for clarity.

Figure 5:
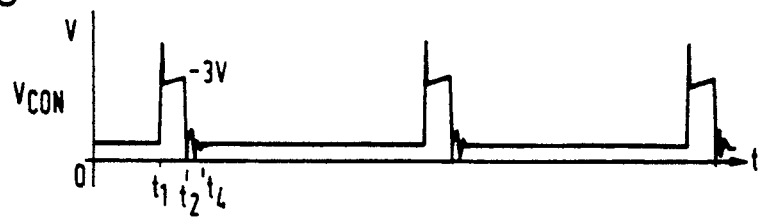
FIGS. 5–9 are corresponding timing diagrams illustrating normal operation of the power supply, and in a more compressed time scale, respectively showing the voltage at the output of the controller, the current in the base of the power transistor, the voltage at the base of the power transistor, the current in the pull-down capacitor and the voltage across the pull-down capacitor.
Figure 7:
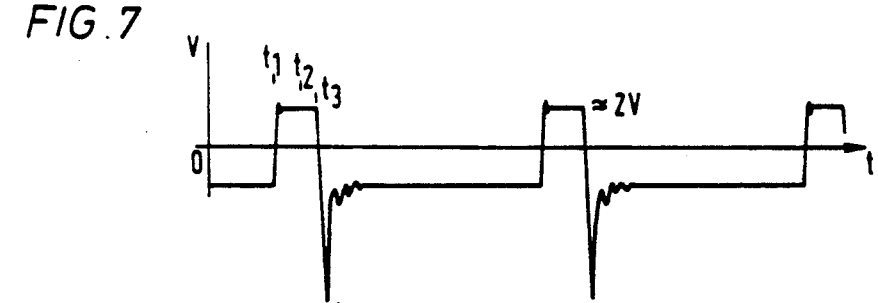

The output pulse $V_{CON}$ of controller 20 goes high at time $t_1$ of FIG. 5, and remains high until time $t_2$, when the output drops essentially to ground. As seen in FIGS. 2 and 7, the voltage at the base of power transistor TP29, however, remains high following the trailing edge of the controller pulse at $t_2$ due to the base charge in the power transistor TP29. As a result, transistor TP29 continues to conduct collector current in saturation following time $t_2$.

Figure 6:
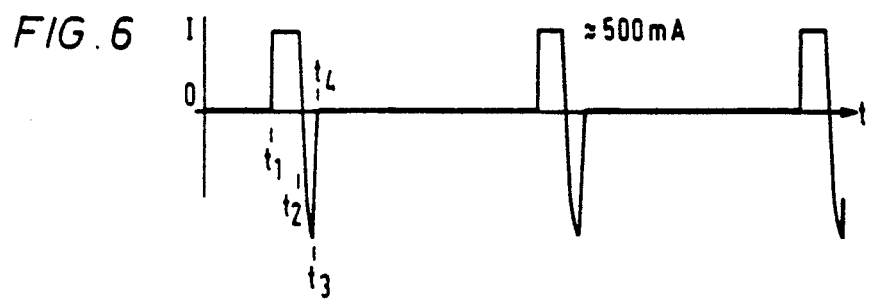

Whereas the push-pull output circuit of controller 20 grounds the positive terminal of capacitor CP24 at the trailing edge, the current in the base of power transistor TP29 reverses at time $t_2$, as shown in FIGS. 3 and 6, as current from capacitor CP24 sweeps out the base charge. Capacitor CP24 is normally charged to about 2.32 V. The base charge is also drained due to collector conduction of transistor TP29, at a relatively slower rate. The time from $t_2$ to $t_3$, during which the charge in the base region is drained, defines the storage time of the circuit.

When the base-emitter charge is exhausted at time $t_3$, current in the base of transistor TP29 quickly goes to zero as shown in FIG. 3, and the voltage at the base goes negative as shown in FIG. 2. About 3.24 microseconds elapses as the saturation excess charge is removed from the base. The base-emitter junction becomes reverse biased, switching the transistor off. Reversing of the bias of the base-emitter junction and the cessation of current in the collector occur between times $t_3$ and $t_4$, providing the downramping portion of the current waveform in the collector, and therefore in the primary winding of the power transformer, as shown in FIG. 4. The voltage at the base of transistor RP29 then returns to a slightly negative voltage, due to the charge on capacitor CP24 and conduction from ground through current sensing resistor RP32, biasing resistor RP29, and inductor LP28. Some ringing occurs in the base voltage due to parasitic capacitance associated with transistor TP29.

In FIG. 5, the respective waveforms are shown over several pulses from controller 20. The output of controller 20, $V_{CON}$, shown in FIG. 5, is substantially a square pulse, but has an initial spike due to the high reactance of inductor LP28 at this edge, and some trailing ringing, due to current reversal and capacitive interaction at the base of the power transistor TP29. Following the initial spike, the level of the pulse increases with charging of capacitor CP24, however, the charging of capacitor CP24 during any one pulse is minimal, being only sufficient to replace the charge drained from capacitor CP24 during the remainder of a cycle. As a result, in normal operation, as shown in FIG. 9, the voltage across capacitor CP24 remains relatively smooth, having a charging phase from times $t_1$ to $t_2$ and a discharging phase as the base charge is drained from times $t_2$ to $t_3$.

In FIG. 6, the current $I_{BASE}$ in the base of transistor TP29 is positive during the voltage pulse $V_{CON}$ from $t_1$ to $t_2$, and reverses at $t_2$ due to the application of the voltage across capacitor CP24 at the trailing edge of the voltage pulse. The current increases in negative amplitude, at a slope defined by inductor LP28 until the charge is exhausted at $t_3$, and returns to zero at $t_4$.

Figure 8:
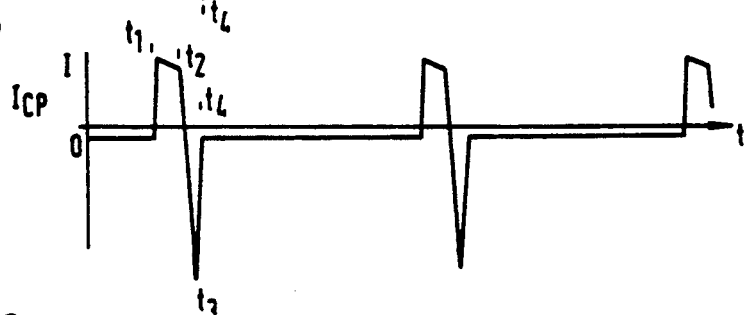
Figure 9:
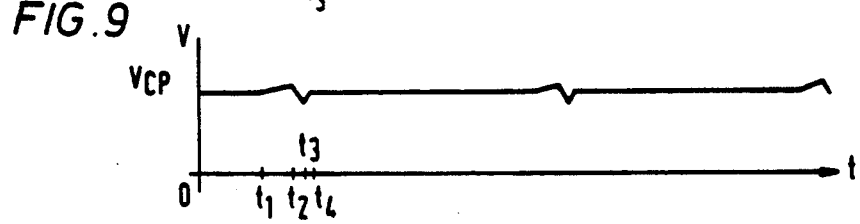
Figure 10:
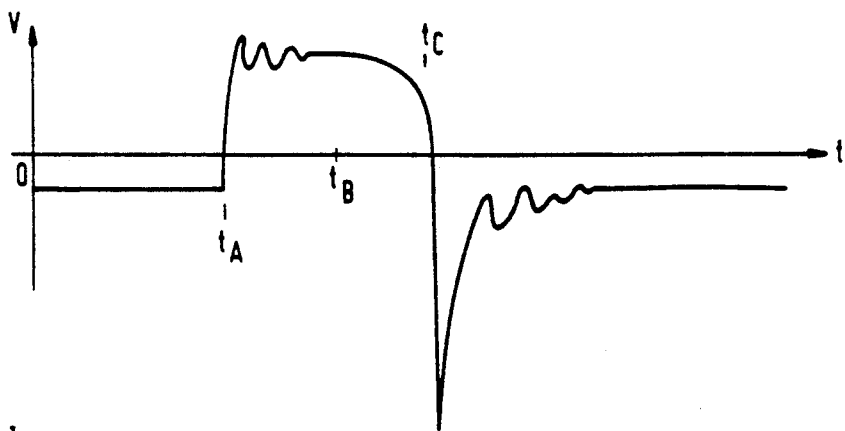
Figure 11:
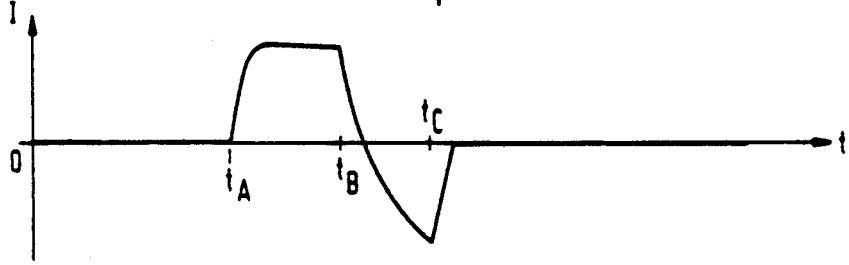
Figure 12:
Figure 13:
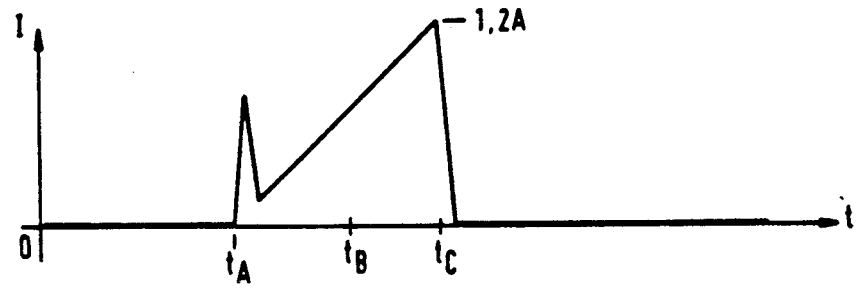

Whereas in normal operation capacitor CP24 remains substantially charged as shown in FIG. 9, the voltage $V_{BASE}$ as shown in FIG. 7 is negative except during the interval from $t_1$ to $t_3$, i.e., during the pulse from controller 20 and after the pulse from $t_2$ to $t_3$, while the base emitter charge is swept out. The current in capacitor CP24 as shown in FIG. 8 is also negative between pulses, due to a current path from ground through resistors RP32, RP29 and inductor LP28. Between $t_2$ and $t_3$, the current in capacitor CP24 is reversed, corresponding to the reversal of current in the base (FIG. 6). The charging of capacitor CP24 between $t_1$ and $t_2$ is equal to the discharging from $t_2$ to $t_4$, plus the discharging which occurs between pulses. Accordingly, the capacitor voltage is relatively steady as in FIG. 9.

Normal operation of the circuit relies on the voltage across capacitor CP24 to turn off the power transistor TP29 within a short time following the trailing edge of a controller pulse. There is a minimum limit, however, because after a given pulse of any width, a certain time elapses while the base charge is swept from transistor TP29. According to an inventive feature, upon initial connection of the circuit to the AC mains, capacitor CP24 is charged through a startup resistor RP324. As shown in FIG. 18, with initial connection to the AC mains, capacitor CP24 is charged to the maximum 2.1 V permitted by diodes DP24, DP26 and DP27, before the power-up supply voltage VCC of controller 20 is high enough for the controller to begin outputting pulses.

The first pulse following plug-in startup as shown in FIGS. 10-13 is much the same as the steady state pulses discussed above. Following the trailing edge of the voltage pulse $V_{CON}$ at the output of controller 20 (FIG. 12), the base current $I_{BASE}$ reverses due to the voltage reversal (FIG. 10) provided by output transistor 68 grounding the positive terminal of capacitor CP24, sweeping out the base-emitter charge. When the charge is exhausted at time $t_3$, the base current returns to zero at $t_4$ and the collector current drops to zero. The collector current ICOL continues to increase so long as transistor TP29 is conducting, to a peak of about 1.3 A, with a storage time of about 2 microseconds. The sweeping of the base charge is such that the cessation of collector current (FIG. 13) follows shortly after the falling edge of the controller output pulse.

Figure 14:
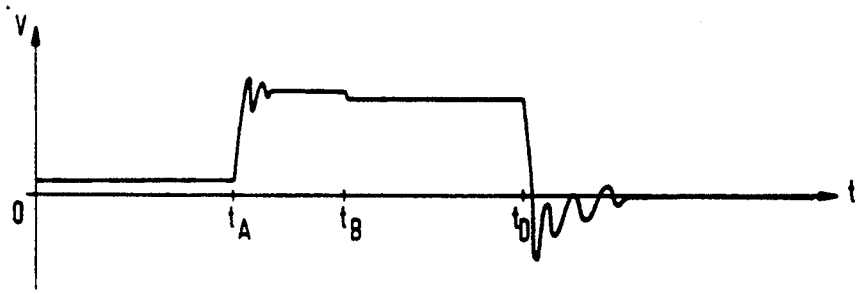
Figure 15:
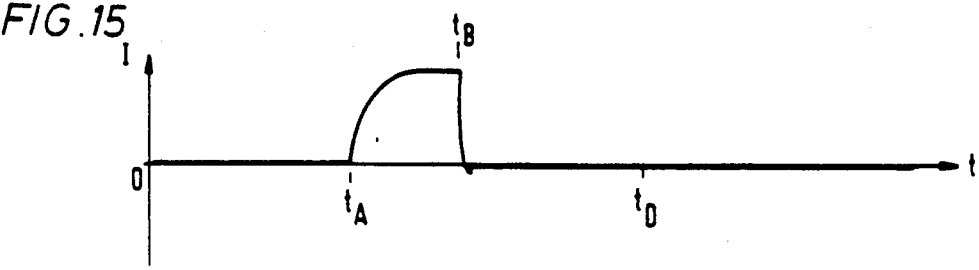
Figure 16:
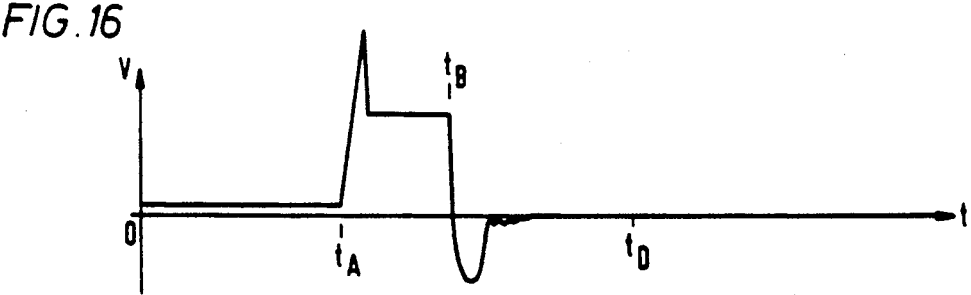
Figure 17:
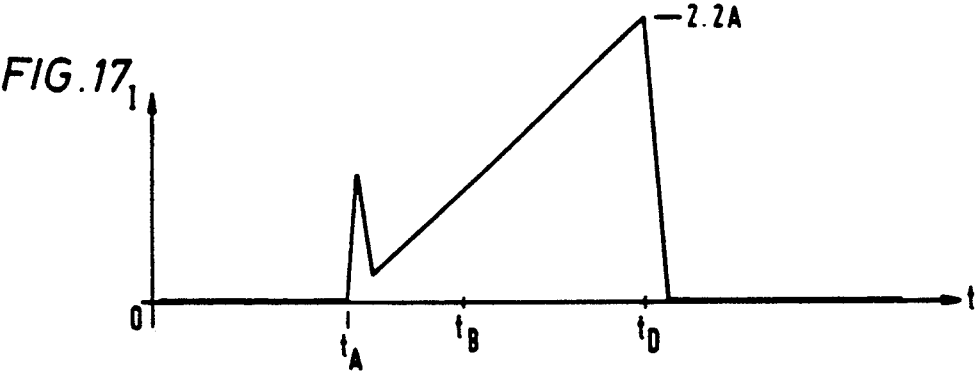

The situation depicted in FIGS. 10-13 can be directly compared to the performance of the same circuit in the absence of resistor RP324 precharging capacitor CP24, as shown in FIGS. 14-17. FIGS. 14-17 illustrate the initial pulse. However, the differences in the waveforms of FIGS. 14-17, as compared to FIGS. 10-13, will persist over a number of controller pulse cycles. The base voltage as shown in FIG. 14 rises at time $t_4$ with the rising edge of the output pulse from controller 20, shown in FIG. 16. Reversal of the base current at the trailing edge, time $t_B$, of the controller output pulse cannot occur or at best is only minimal because, in the absence of resistor RP324, capacitor CP24 is charged only by the output of the controller 20 via current from VCC through resistor RP26. A number of pulses must occur to charge capacitor CP24 up to a voltage where the accumulated charge is sufficient to completely sweep the base-emitter charge from transistor TP29.

At time $t_B$, the base voltage drops slightly, but the base region remains sufficiently charged to maintain conduction of transistor TP29. At some time $t_D$ after the trailing edge of the controller pulse, the base current flow in transistor TP29 and other processes have exhausted the base charge, and the base voltage $V_{BASE}$ finally drops off. By this time the collector current in transistor TP29 has risen to a much higher level, about 2.2 A peak, than it would rise in the steady state when capacitor CP24 is effective for sweeping out the base charge. As a result of the ineffectiveness of the uncharged pull-down capacitor, the circuit operates with a storage time of about 5.78 microsecond This undesirably defeats the soft start protection feature of the controller which attempts to limit the first current pulse to three microseconds.

A further undesirable aspect is that the positive terminal of capacitor CP24 will not be pulled down to ground potential by conduction of Darlington transistor 68, but instead to the collector terminal voltage level. This level for a Darlington transistor could be significant-about 0.8 volt.

The start-up output limiting circuits in the TEA2260 controller are meant to limit the occurrence or persistence of overvoltage or overvoltage conditions. A power supply is especially prone to overcurrent conditions when initially coupled to the AC mains, because storage capacitors and other components of the load circuits draw maximum current. The lack of an effective means for sweeping out the base charge in power transistor TP29, during start-up phases of operation, tends to defeat the protection circuits because transistor TP29 continues to conduct for a longer time following the trailing edge of a controller pulse. The controller is less able to precisely control the output of the power supply.

FIGS. 19 and 20 compare the start-up operation of the circuit of the invention with a comparable circuit lacking precharging of the pull-down capacitor. In FIG. 19, the base voltage according to the invention is negative due to precharging of capacitor CP24 when the first pulse occurs at the output of controller 20. A transient variation in the amplitude of the low-going base voltage spike occurs as the voltage at the positive terminal of capacitor CP24 drops to its steady state value. However, the power supply promptly achieves steady state operation.

In FIG. 20, the base voltage in near zero rather than negative preceding the first controller pulse. The negative base voltage spike is missing or small for a number of successive cycles during which the controller is relatively less able to precisely control the current in transistor TP29. Over about 3.82 milliseconds, capacitor CP24 becomes charged to about 1.8 V, the base voltage preceding a pulse drops to negative, and steady operation is achieved. However, direct comparison of FIGS. 19 and 20 shows that the interval to achieve steady state operation, during which interval the protection circuits of the controller are relatively ineffective, is much shorter when precharging the pull-down capacitor according to the invention than when starting up without a voltage thereon. Whereas the circuit of the invention achieves its short storage time upon the initial controller pulse, a comparable circuit operating, for example, at 18 KHz requires some 68 cycles over 3.8 milliseconds to achieve a short storage time.

What is claimed is:
1. A switched mode power supply comprising:
   a source of unregulated voltage;
   a load;
   a switching transistor coupling said source to said load;
   a capacitor coupled to a control terminal of said transistor;
   a diode coupled in parallel with said capacitor;
   a source of control pulses coupled to the control terminal of said transistor through said capacitor; and
   means for charging said capacitor to a value determined by the voltage drop across said diode, from said source of unregulated voltage.

2. A power supply according to claim 1, comprising an inductor coupled in series with said capacitor.

3. A power supply according to claim 1, comprising a transformer coupled between said transistor and said load.

4. A television receiver comprising:
a switched mode power supply for regulating at least one output voltage by generation of output pulses coupled to a power transistor, the power transistor being coupled to an inductance which is coupled to an input voltage, the switched mode power supply having a sense input operable to regulate the output voltage by modulating conduction of said power transistor so as to maintain the output voltage at predetermined levels;
a circuit coupling the output pulses to a base of the power transistor, the circuit comprising a pull down capacitor in series with the base, and a diode coupled in parallel with the pull down capacitor, whereby during an output pulse the pull down capacitor is charged according to the first polarity to a voltage determined by the forward drop through the diode, causing the power transistor to conduct, and following an output pulse the capacitor applies an opposite polarity to the base of the power transistor for sharply ceasing conduction of current through the power transistor; and
means for precharging the capacitor prior to the appearance of the first one of said output pulses.

5. The television receiver according to claim 4, wherein the means coupled to the unregulated input voltage and to the pull down capacitor comprise a resistor coupled between the unregulated input voltage and a terminal of the pull down capacitor.

6. The television receiver according to claim 4, further comprising a power supply controller in the switched mode power supply, the sense input being an error input of the power supply controller coupled to the output voltage.

7. The television receiver of claim 4 in which said inductance is a primary winding of a power transformer, and said sense input is coupled to a secondary winding of said power transformer.

8. The television receiver according to claim 4, wherein the sense input is coupled to an error amplifier, and produces the pulses in a burst mode characterized by distinct thresholds between which the controller regulates a voltage at the power input, thereby providing a burst mode of operation.

9. The television receiver according to claim 4, wherein the means coupled to the unregulated input voltage and to the pull down capacitor comprise a resistor coupled between the unregulated input voltage and a terminal of the pull down capacitor, and wherein the power supply controller has a push-pull output stage, the pull down capacitor being coupled to the push-pull output stage.

10. The television receiver according to claim 9, wherein the power supply controller comprises an integrated circuit having biasing terminals for the push-pull output stage which are internal to the integrated circuit and are therefore inaccessible.

11. The television receiver according to claim 9, wherein the resistor is coupled to an output of the push-pull stage which is coupled to the pull-down capacitor.

* * * * *